(12) United States Patent
Zhan et al.

(10) Patent No.: US 12,525,903 B2
(45) Date of Patent: Jan. 13, 2026

(54) POWER TOOL AND CONTROL METHOD THEREOF

(71) Applicant: Positec Power Tools (Suzhou) Co., Ltd., Suzhou (CN)

(72) Inventors: Kang Zhan, Suzhou (CN); Naifu Chen, Suzhou (CN); Guangdong Wei, Suzhou (CN); Jun Lu, Suzhou (CN); Hang Zhu, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 148 days.

(21) Appl. No.: 18/389,441

(22) Filed: Nov. 14, 2023

(65) Prior Publication Data

US 2024/0088807 A1 Mar. 14, 2024

Related U.S. Application Data

(63) Continuation of application No. PCT/CN2022/092633, filed on May 13, 2022.

(30) Foreign Application Priority Data

May 14, 2021 (CN) .......................... 202110528366.6

(51) Int. Cl.
 *H02P 6/15* (2016.01)
 *B25B 21/02* (2006.01)
 *H02P 6/17* (2016.01)

(52) U.S. Cl.
 CPC .............. *H02P 6/153* (2016.02); *B25B 21/02* (2013.01); *H02P 6/17* (2016.02)

(58) Field of Classification Search
 CPC .......... H02P 6/153; H02P 6/17; H02P 27/085; H02P 2205/07; H02P 6/08; B25B 21/02; B25B 23/1475

(Continued)

(56) References Cited

U.S. PATENT DOCUMENTS 7,109,675 B2 * 9/2006 Matsunaga ........... H02J 7/0031
 173/217
9,314,855 B2 * 4/2016 Ookubo .................. H02P 23/03
 (Continued)

FOREIGN PATENT DOCUMENTS

CN 103684122 3/2014
CN 106487286 3/2017
(Continued)

OTHER PUBLICATIONS

European Extended Search report for related European Application No. EP22806856.5, dated Apr. 9, 2025, 9 pages.

(Continued)

*Primary Examiner* — David Luo
(74) *Attorney, Agent, or Firm* — Lee & Hayes, P.C.

(57) ABSTRACT

A power tool includes a brushless motor, including a stator and a rotor; an inverter circuit, including a plurality of switch components, where the plurality of switch components are configured to perform a switch action to control driving of the brushless motor; and a controller, electrically connected to the inverter circuit and the brushless motor, the controller including a load detection module configured to detect a parameter indicating a workload of the brushless motor. In response to the parameter being less than a set threshold, the controller is configured to control the brushless motor to maintain a first target rotational speed; and in response to the parameter being greater than or equal to a set threshold, the controller controls the brushless motor to maintain a second target rotational speed. The first target rotational speed may be greater than the second target rotational speed.

13 Claims, 8 Drawing Sheets

(58) Field of Classification Search
USPC .......................................................... 318/17, 3
See application file for complete search history.

(56) References Cited

U.S. PATENT DOCUMENTS

| | | | |
|---|---|---|---|
| 9,729,091 B2 * | 8/2017 | Hano | ...................... H02P 6/181 |
| 2016/0008961 A1 | 1/2016 | Takano et al. | |
| 2016/0107297 A1 | 4/2016 | Ishikawa et al. | |
| 2018/0248507 A1 | 8/2018 | Vanko et al. | |
| 2018/0297179 A1 | 10/2018 | Osada et al. | |
| 2019/0263015 A1 | 8/2019 | Huber et al. | |

FOREIGN PATENT DOCUMENTS

| | | |
|---|---|---|
| CN | 110739890 | 1/2020 |
| CN | 110880903 | 3/2020 |
| CN | 112571359 | 3/2021 |
| KR | 10183497 | 3/2018 |

OTHER PUBLICATIONS

European Supplemental Search Report for related European Patent Application No. EP22806856, dated Apr. 9, 2025, 2 pages.
Translated First Chinese Office Action for related Chinese Patent Application No. CN20228005223.X,, dated Jun. 28, 2025, 9 pages.
Translated Chinese Search Report for related Chinese Patent Application No. 20228005223.X, dated Jun. 26, 2025, 6 pages.

* cited by examiner

POWER TOOL AND CONTROL METHOD THEREOF

This application is a Continuation application of International Application No. PCT/CN2022/092633, filed on May 13, 2022, which claims benefit of and priority to Chinese Patent Application No. 202110528366.6, filed on May 14, 2021, all of which are hereby incorporated by reference in their entirety for all purposes as if fully set forth herein.

TECHNICAL FIELD

The present application relates to the control field, and in particular, to a power tool and a control method thereof.

BACKGROUND

Power tools have been widely used in homes, gardens, and other operation environments, and bring great convenience to people's life and work. The power tool may be powered by a battery pack. After a switch of the power tool is switched on to supply power, a motor rotates and drives a transmission mechanism to achieve various power operations.

In ordinary power tools, adjustment of a pulse-width modulation (PWM) duty cycle in an open-loop or closed-loop mode is generally used to achieve an expected output power. However, the adjustment of the PWM duty cycle alone cannot meet a requirement for obtaining a higher or more stable output power.

SUMMARY

The present application aims to resolve at least one of the technical problems in the prior art. Therefore, an objective of the present application is to provide a power tool and a control method thereof. The power tool can satisfy a desire of an output power for a user.

The present application provides a power tool, comprising:
  a power supply unit;
  a brushless motor, comprising a stator and a rotor;
  an inverter circuit, comprising a plurality of switch components, wherein the plurality of switch components are configured to perform a switch action to control driving of the brushless motor; and
  a controller, electrically connected to the inverter circuit and the brushless motor, the controller comprising a load detection module configured to detect a parameter indicating a workload of the brushless motor,
  wherein in response to the parameter being less than a set threshold, the controller is configured to control the brushless motor to maintain a first target rotational speed,
  wherein in response to the parameter being greater than or equal to the set threshold, the controller is configured to control the brushless motor to maintain a second target rotational speed, and
  wherein the first target rotational speed is greater than the second target rotational speed.

In one of the embodiments, the controller is configured to adjust a pulse-width modulation (PWM) duty cycle and/or a conduction angle of a switch component of the plurality of switch components, so that the brushless motor maintains the first target rotational speed or the second target rotational speed.

In one of the embodiments, the controller is further configured to adjust an advance angle of a switch component of the plurality of switch components.

In one of the embodiments, the controller is further configured to increase the PWM duty cycle and/or the conduction angle of the switch component in response to the parameter being less than the set threshold and an actual motor rotational speed being less than the first target rotational speed or in response to the parameter being greater than or equal to the set threshold and the actual motor rotational speed being less than the second target rotational speed, wherein an adjustment priority of the PWM duty cycle is higher than an adjustment priority of the conduction angle.

In one of the embodiments, the controller is further configured to decrease the PWM duty cycle and/or the conduction angle of the switch component in response to the parameter being less than the set threshold and an actual motor rotational speed being greater than the first target rotational speed or in response to the parameter being greater than or equal to the set threshold and the actual motor rotational speed being greater than the second target rotational speed, wherein an adjustment priority of the conduction angle is higher than an adjustment priority of the PWM duty cycle.

In one of the embodiments, the brushless motor is a three-phase brushless motor, the brushless motor comprises a position sensor, the controller is configured to calculate an actual motor rotational speed based on a signal transmitted by the position sensor, and a conduction angle of each phase in the three-phase brushless motor has a minimum value of 120° and a maximum value of 180°.

In one of the embodiments, the controller is configured to adjust the conduction angle by a fixed increment slope, and a fixed increment associated with the fixed increment slope is a value from 0.1° to 0.5°.

In one of the embodiments, the power tool is an impact fastening tool, wherein the impact fastening tool comprises an impact mechanism, and in response to the parameter being greater than or equal to the set threshold, the impact mechanism is configured to perform an impact action.

The present application further provides a method for controlling a power tool, comprising:
  detecting, by a controller, a parameter indicating a workload of a brushless motor, and determining an operational status of the power tool based on the parameter; and
  controlling, by the controller, in response to determining that the parameter is less than a set threshold, the brushless motor to maintain a first target rotational speed; or
  controlling, by the controller, in response to determining that the parameter is greater than or equal to the set threshold, the brushless motor to maintain a second target rotational speed,
  wherein the first target rotational speed is greater than the second target rotational speed.

In one of the embodiments, the controlling, by the controller, the brushless motor to maintain the first target rotational speed, or the controlling, by the controller, the brushless motor to maintain the second target rotational speed comprises:
  calculating, by the controller, an actual motor rotational speed of the brushless motor, and
  increasing, by the controller, in response to determining that the actual motor rotational speed is less than the first target rotational speed or the actual motor rotational speed is less than the second target rotational speed, a pulse-width modulation (PWM) duty cycle and/or a conduction angle for driving the brushless motor, wherein an adjustment priority of the PWM duty cycle is higher than an adjustment priority of the conduction angle.

In one of the embodiments, the controlling, by the controller, the brushless motor to maintain the first target rotational speed, or the controlling, by the controller, the brushless motor to maintain the second target rotational speed comprises:

calculating, by the controller, an actual motor rotational speed of the brushless motor, and decreasing, by the controller, in response to determining that the actual motor rotational speed is greater than the first target rotational speed or the actual motor rotational speed is greater than the second target rotational speed, a conduction angle and/or a pulse-width modulation (PWM) duty cycle for driving the brushless motor, wherein an adjustment priority of the conduction angle is higher than an adjustment priority of the PWM duty cycle.

In one of the embodiments, further comprising adjusting, by the controller, an advance angle for driving the brushless motor.

The present application further provides a power tool, comprising:

a brushless motor, comprising a stator and a rotor;

an inverter circuit, comprising a plurality of switch components, wherein the plurality of switch components are configured to perform a switch action to control driving of the brushless motor; and a controller, electrically connected to the inverter circuit and the brushless motor, the controller comprising a load detection module configured to detect a parameter indicating a workload of the brushless motor, wherein in response to the parameter being greater than or equal to a set threshold, the controller is configured to control the brushless motor to maintain a target rotational speed, wherein in response to the parameter being less than the set threshold, the controller is configured to control the brushless motor in an open-loop mode, and the brushless motor has a maximum rotational speed under the control in the open-loop mode, and wherein the maximum rotational speed under the control in the open-loop mode is greater than the target rotational speed.

In one of the embodiments, the controller is configured to adjust a pulse-width modulation (PWM) duty cycle and/or a conduction angle of a switch component of the plurality of switch components, so that the brushless motor maintains the target rotational speed.

In one of the embodiments, the controller is configured to increase the PWM duty cycle and/or the conduction angle of the switch component in response to the parameter being greater than or equal to the set threshold and an actual motor rotational speed being less than the target rotational speed, and wherein an adjustment priority of the PWM duty cycle is higher than an adjustment priority of the conduction angle.

In one of the embodiments, the controller is configured to decrease the conduction angle and/or the PWM duty cycle of the switch component in response to the parameter being greater than or equal to the set threshold and an actual motor rotational speed is greater than the target rotational speed, and wherein an adjustment priority of the conduction angle is higher than an adjustment priority of the PWM duty cycle.

The present application further provides a method for controlling a power tool, comprising:

detecting, by a controller, a parameter indicating a workload of a brushless motor, and determining an operational status of the power tool based on the parameter; and controlling, by the controller, in response to determining that the parameter is less than a set threshold, the brushless motor in an open-loop mode, the brushless motor having a maximum rotational speed under the control in the open-loop mode; or controlling, by the controller, in response to determining that the parameter is greater than or equal to the set threshold, the brushless motor to maintain a target rotational speed, wherein the maximum rotational speed in the open-loop mode is greater than the target rotational speed.

In one of the embodiments, the controlling, by the controller, the brushless motor to maintain the target rotational speed comprises:

calculating, by the controller, an actual motor rotational speed of the brushless motor, and increasing, by the controller in response to the actual motor rotational speed being less than the target rotational speed, a pulse-width modulation (PWM) duty cycle and/or a conduction angle for driving the brushless motor, wherein an adjustment priority of the PWM duty cycle is higher than an adjustment priority of the conduction angle.

In one of the embodiments, the controlling, by the controller, the brushless motor to maintain the target rotational speed comprises:

calculating, by the controller, an actual motor rotational speed of the brushless motor, and decreasing, by the controller, in response to the actual motor rotational speed being greater than the target rotational speed, the conduction angle and/or the PWM duty cycle for driving the brushless motor, wherein an adjustment priority of the conduction angle is higher than an adjustment priority of the PWM duty cycle.

According to the present application, a motor rotational speed of the power tool is controlled to maintain a lower second target rotational speed, so that the power tool is prevented from being damaged due to large fluctuations in the motor rotational speed under a heavy load. The motor rotational speed of the power tool is controlled to maintain a higher first target rotational speed, so that working efficiency of the power tool is improved before entering a heavy load state.

BRIEF DESCRIPTION OF THE DRAWINGS

To describe the technical solutions in the embodiments of the present application more clearly, the following briefly introduces the accompanying drawings required for describing the embodiments. The accompanying drawings in the following description show merely some embodiments of the present application, and a person of ordinary skill in the art may still derive other drawings from these accompanying drawings without creative efforts.

DETAILED DESCRIPTION

Embodiments of the present application further provide a power tool and a control method thereof. The following describes the embodiments of the present application in detail with reference to the accompanying drawings.

The following clearly and completely describes the technical solutions in the embodiments of the present application in detail. The described embodiments are merely some rather than all of the embodiments of the present application. Based on the embodiments of the present application, all other embodiments obtained by a person of ordinary skill in the art without creative efforts shall fall within the protection scope of the present application.

It should be noted that, when a component is referred to as "being disposed to" another component, the component may be directly on the another component, or an intermediate component may also be present. When a component is considered to be "connected to" another component, the component may be directly connected to the another component, or an intermediate component may also be present. The terms "vertical", "horizontal", "left", "right", and similar expressions used in this specification are merely used for purposes of illustration but not indicate a unique implementation.

Unless otherwise defined, meanings of all technical and scientific terms used in this specification are the same as those usually understood by a person skilled in the art to which the present application belongs. In this specification, terms used in this specification of the present application are merely intended to describe objectives of the specific embodiments, but are not intended to limit the present application.

Figure 1:
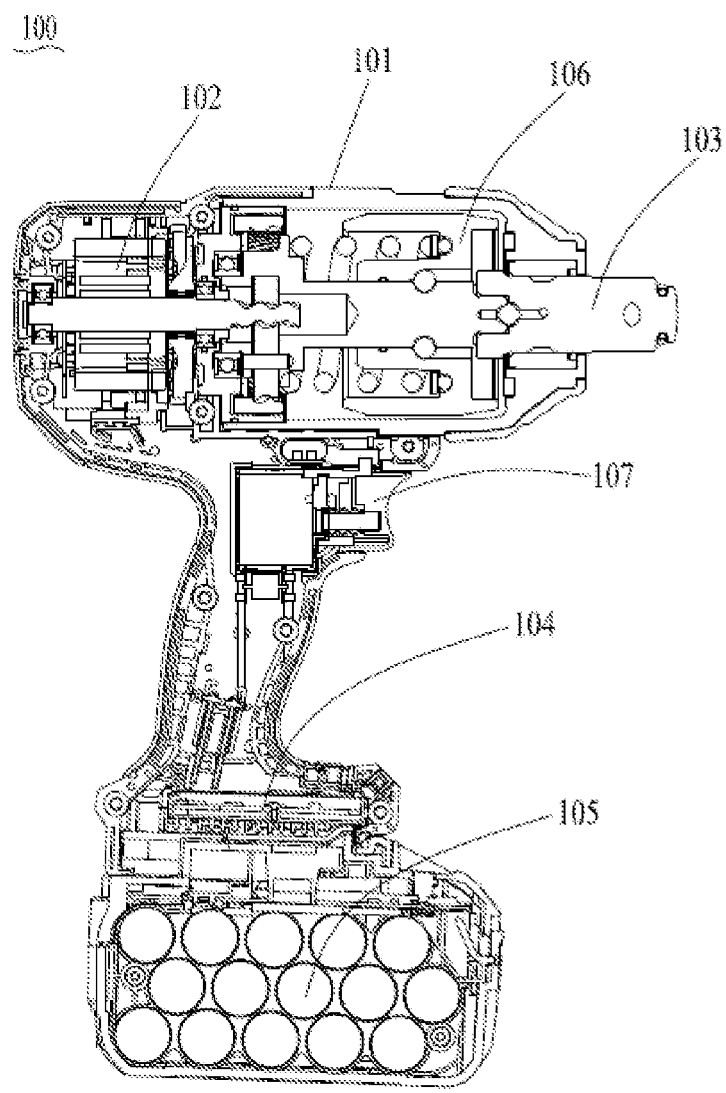
FIG. 1 is a schematic structural diagram of an impact fastening tool according to an example embodiment of the present application.

FIG. 1 is a schematic structural diagram of an impact fastening tool according to an embodiment of the present application. It should be understood that the embodiments of the present application may also be applied to another fastening tool, grinding tool, cutting tool, cleaning tool, garden tool, and the like.

The impact fastening tool 100 includes: a housing 101, a motor 102, an output end 103, a controller 104, an impact mechanism 106, and a battery pack 105.

The motor 102 is disposed in an upper cavity of the housing 101 and includes a rotor and a stator. In this embodiment, the motor 102 is a three-phase brushless direct current (BLDC) motor and is powered by the battery pack 105 under control of the controller 104. The motor may also use another form of motor. This is not limited herein.

A trigger switch 107 may be disposed on a handle of the housing 101 for providing user input to the controller 104, so that the controller 104 controls an operation of the impact fastening tool 100 based on instructions input by the user. The trigger switch 107 may be a trigger switch based on a displacement sensor, or may be another form of switch, such as switches based on a touch sensor, a capacitive sensor, and the like.

The controller 104 may be disposed in a cavity at a lower part of the handle, and the controller 104 may include a central processing unit (CPU) or another form of processing unit having data processing capabilities and/or instruction execution capabilities.

The battery pack 105 may be detachably disposed on the housing 101, or may be disposed in the housing 101 in a built-in mode, or may even be connected to an external power cord, so that the impact fastening tool 100 and the battery pack 105 are connected at a certain length. Although the impact fastening tool of this embodiment uses the battery pack as a power supply unit, it should be understood that the impact fastening tool may also use a conventional alternating current power supply as the power supply unit.

The impact mechanism 106 includes a tripping unit mainly formed by a hammer and an anvil. When a workload of the output end 103 increases to a certain extent, the hammer and anvil rotate from one body to a relative rotation with an impact action, so that the hammer repeatedly exerts impact forces in a radial direction of the anvil, that is a tripping state.

Figure 2:
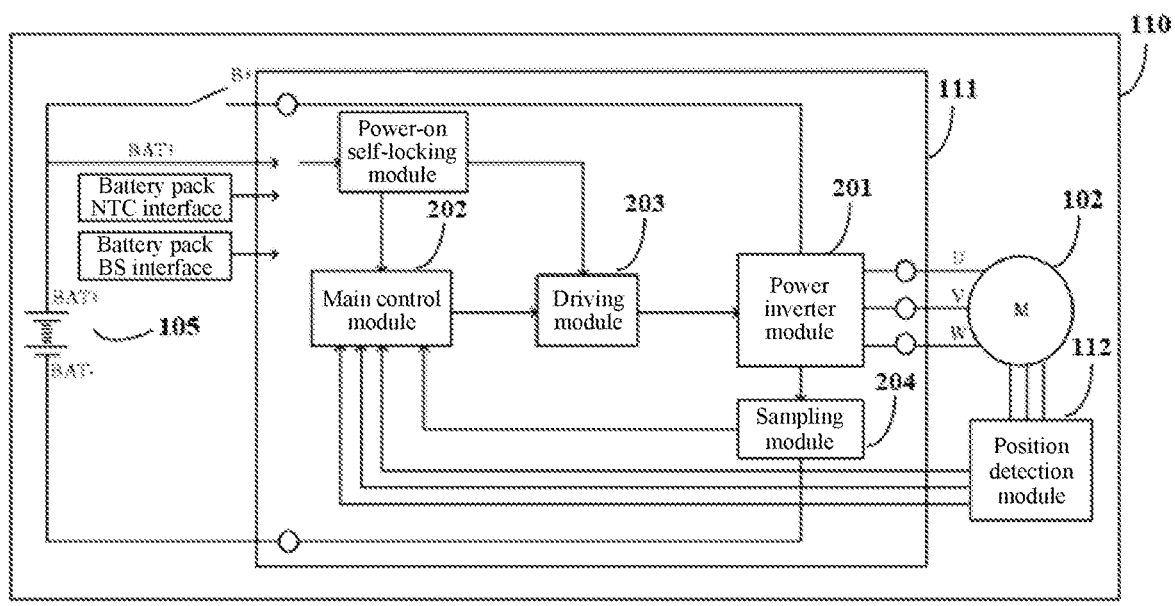
FIG. 2 is a circuit block diagram of a control system for an impact fastening tool according to an example embodiment of the present application.

FIG. 2 is a circuit block diagram of a control system 110 for an impact fastening tool according to this embodiment. The control system 110 includes a motor control circuit 111, a battery pack 105, a motor 102, and a position detection module 112. The position detection module 112 is generally disposed in the motor, and is configured to detect position information of a rotor on the motor 102 and transmit the position information to the controller. In this embodiment, the position detection module 112 uses a Hall sensor, or may also use another type of position sensor such as a magneto electric sensor and a photoelectric sensor. A main control module 202 receives a position signal from the position detection module 112 and calculates an actual motor rotational speed of the motor 102 based on the position signal. Compared with a motor without the position detection module, a motor with the position detection module used in this embodiment can have a larger conduction angle and advance angle adjustment range.

Because a motor coil is an inductive load, a current in the coil has a certain delay relative to an on load voltage on the coil. Generally, setting of the advance angle is used to improve this problem. In this embodiment, the setting of the advance angle is implemented by adjusting an installation position of the Hall sensor. As a transformation, a program may also be embedded in control software to set a fixed or variable advance angle, and an effect is similar to that of this embodiment.

The motor control circuit 111 is configured to drive and control the motor 102. The motor control circuit 111 includes a power inverter module 201, a main control module 202, a driving module 203, and a sampling module 204.

The sampling module 204 is configured to collect a workload parameter of the motor 102 and send the parameter to the controller 104, so that the controller 104 determines an operational status based on the parameter.

Figure 3A:
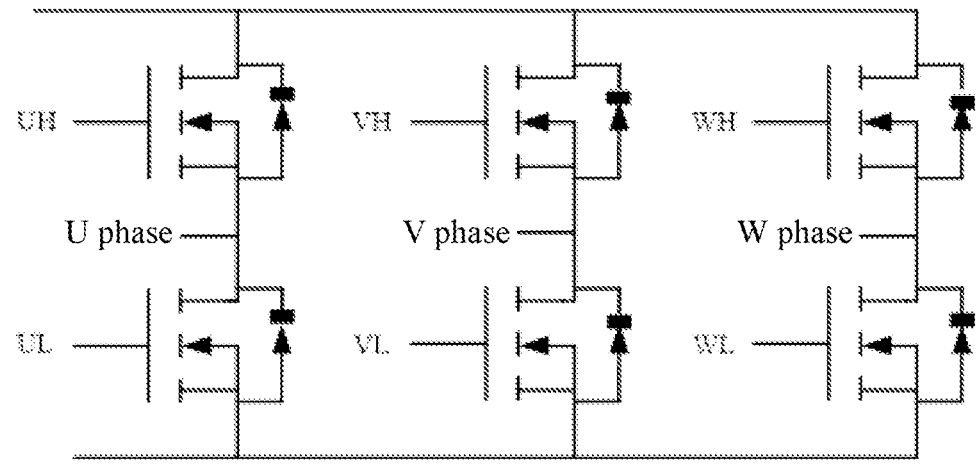
FIG. 3A is a schematic diagram of a power inverter module according to an example embodiment of the present application.

FIG. 3A is a schematic diagram of a power inverter module 201 according to this embodiment. The power inverter module 201 is a three-phase bridge inverter circuit, and includes six switch components. The six switch components are divided into upper bridge arms and lower bridge arms. The six switch components include three upper-side switches and three lower-side switches, which are driven by high driving signals UH, VH and WH and low driving signals UL, VL and WL respectively. A source of the upper-side switch of each phase is connected to a drain of the lower-side switch to output a power signal for driving the motor 102. The main control module 202 determines a switch frequency and phase commutation timing of the switch components in the power inverter module 201 based on a signal feedback, thereby controlling a rotational speed of the motor 102.

A conventional constant speed power tool adjusts a motor rotational speed by adjusting a pulse-width modulation (PWM) duty cycle. The duty cycle during the conduction time of each phase conduction angle determines voltage duration supplied to the motor. Generally, the greater the duty cycle, the longer the voltage duration supplied to the motor during the conduction time, and the greater the motor rotational speed. The actual motor rotational speed of the motor may be calculated based on the position information measured by the position detection module. When the actual motor rotational speed is lower than the target rotational speed, the motor rotational speed is increased by increasing the PWM duty cycle. However, when the PWM duty cycle increases to a maximum value of 100%, in a case that the actual motor rotational speed has not reached the target rotational speed, and because voltage duration cannot be continued to increase during conduction time, the motor rotational speed cannot be increased by increasing the PWM duty cycle, which causes the power tool to fail to achieve an expected output.

Figure 3B:
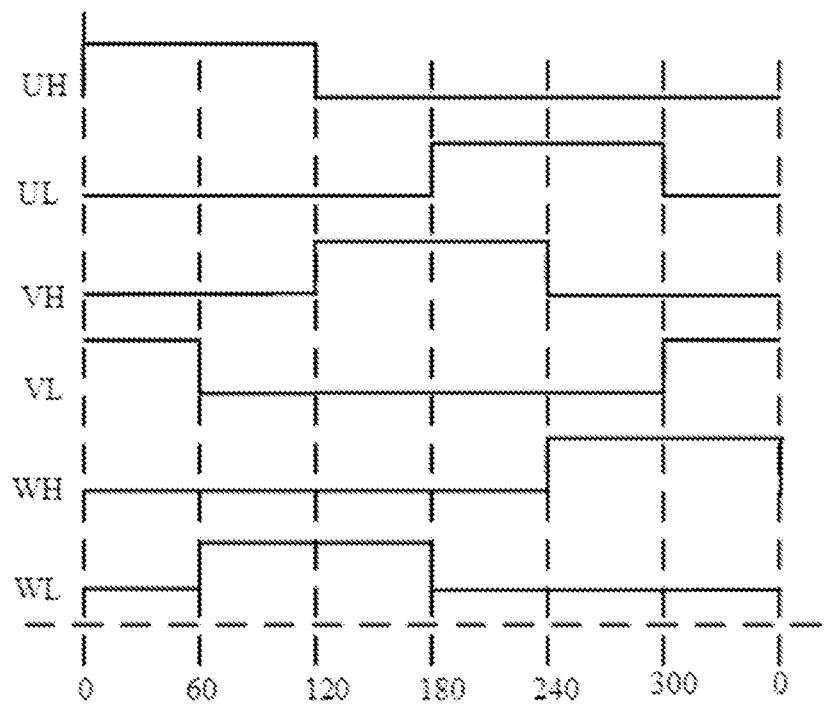
FIG. 3B is a driving sequence diagram of an initial conduction angle according to an example embodiment of the present application.
Figure 4:
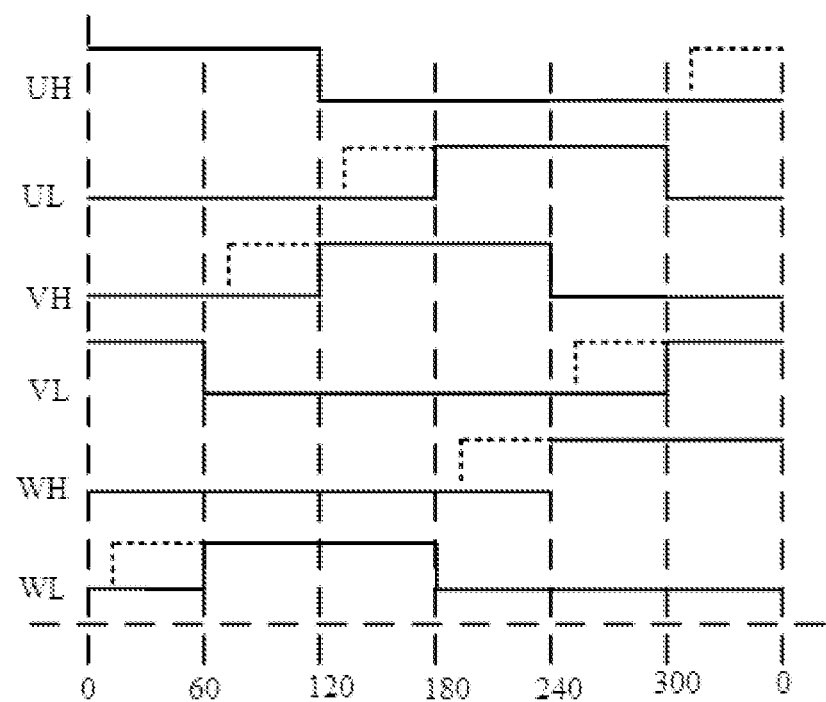
FIG. 4 is a driving sequence diagram for increasing a conduction angle according to an example embodiment of the present application.

FIG. 3B is a driving sequence diagram of a power inverter module 201 when the PWM duty cycle of the three-phase brushless motor is 100%, the conduction angle of each phase is an initial value of 120°, and the advance angle is 0°. It can be seen that between two adjacent phases (such as U phase and V phase), the conduction time of the conduction angle does not overlap. In this embodiment, to further increase the rotational speed of the power tool to achieve the expected output, as shown in FIG. 4, the conduction angle is increased, so that the conduction angles of two adjacent phases partially overlap during commutation, which helps to increase a total voltage provided to the motor, thereby further increasing the motor rotational speed.

Specifically, when the actual motor rotational speed is less than the target rotational speed and the motor rotational speed needs to be increased, an adjustment of the PWM duty cycle is prioritized over an adjustment of the conduction angle; or when the actual motor rotational speed is larger than the target rotational speed and the motor rotational speed needs to be decreased, an adjustment of the conduction angle is prioritized over an adjustment of the PWM duty cycle. Priority refers to adjust a variable with a high priority first, and then adjust a variable with a low priority after the variable reaches a maximum value or a minimum value. For example, in a case that the actual motor rotational speed is less than the target rotational speed, priority is given to increasing the PWM duty cycle to increase the motor rotational speed. When the PWM duty cycle reaches the maximum value, in a case that there is still a need to increase speed, then the conduction angle is increased. In a case that the actual motor rotational speed is greater than the target rotational speed and the conduction angle is greater than the initial value, the priority is given to decreasing the conduction angle to decrease the motor rotational speed. When the conduction angle is decreased to the initial value, there is still a need to decrease speed, and then the PWM duty cycle is decreased. The combination of the two adjustment modes greatly broadens an adjustment range of the motor rotational speed and improves flexibility of the motor rotational speed adjustment. It should be understood that the adjustment of the advance angle may also be added on the basis of above to further improve amplitude and flexibility of the rotational speed adjustment.

In this embodiment, a maximum value of the PWM duty cycle is set to 100%, or a maximum value of the PWM duty cycle may also be set to 95% or another in the software program. The initial value and the maximum value of the conduction angle basically depend on parameters of the motor itself. In this embodiment, the initial value of the conduction angle of the three-phase brushless direct current motor is 120°, the maximum value is 180°, the initial value of the advance angle is 0°, and the maximum value is 60°.

Specifically, when the conduction angle is adjusted, in some examples, it is to use a fixed increment slope for adjustment, and the increment ranges from 0.1° to 0.5°. For example, when an increment value is 0.1°, the motor rotational speed adjustment is more stable. In addition, it may be considered to use a floating increment slope for adjustment. For example, when it is determined that a difference between the actual motor rotational speed and the target rotational speed is less than a preset threshold, a smaller increment slope for adjustment is used, and when the difference between the actual motor rotational speed and the target rotational speed is greater than or equal to the preset threshold, a larger increment slope for adjustment is used. In a case that the conduction angle reaches 180° but the actual motor rotational speed still cannot reach the target rotational speed, the conduction angle may be maintained at 180° instead of continuing to increase the conduction angle, so as to avoid a decrease in working efficiency of the motor.

Since the power tool generally needs a higher rotational speed, it is preferable to use advance commutation to increase the conduction angle, which is beneficial to increasing the rotational speed at medium to high speeds. However, it should be understood that, based on specific working conditions and power of the power tool, hysteresis commutation may also be used to increase the conduction angle. Furthermore, the conduction angle may also be adjusted by combining advance commutation and hysteresis commutation.

Using a current flowing through the motor 102 as an example. When a current flowing through the motor collected by the sampling module 204 is less than a set threshold, it is determined that the motor is in a first operational status, and the main control module 202 controls the motor 102 to maintain a first target rotational speed by adjusting the PWM duty cycle and/or the conduction angle. When the current is greater than or equal to the set threshold, it is determined that the motor 102 is in a second operational status, and the main control module 202 controls the motor 102 to maintain a second target rotational speed by adjusting the PWM duty cycle and/or the conduction angle. However, it should be clear that the parameters indicating a load of the motor may also be a vibration of the motor, a force on a working head, a rotational speed of the motor, and another parameter that can represent a size of the load. For accuracy, more than two parameters may be used to indicate the load of the motor.

In some examples, a current threshold is any value from 10A to 20A, and for example, a threshold is 15A. The first operational status may refer to the impact fastening tool being in no load or light load state, for example, the impact mechanism 106 does not perform an impact fastening action; and the second operational status may refer to the impact fastening tool being in a heavy load state, for example, the impact mechanism 106 performs an impact fastening action.

In this embodiment, the first target rotational speed is greater than the second target rotational speed. The motor rotational speed of the impact fastening tool is controlled to maintain a lower second target rotational speed in the second operational status, so that the impact fastening tool is prevented from being damaged due to large fluctuations in the motor rotational speed under a heavy load. In addition, in the first operational status, the motor rotational speed of the impact fastening tool is controlled to maintain the first target rotational speed that is higher than the second target rotational speed, so that working efficiency of the impact fastening tool is improved before the motor enters a heavy load state.

Specifically, the first target rotational speed is any value from 21,850 to 24,150 RPM (r/min). In some examples, the first target rotational speed is 23,000 RPM. The second target rotational speed is any value from 12,350 to 13,650 RPM. For example, the second target rotational speed is 13,000 RPM. It should be understood that both the first target rotational speed and the second target rotational speed may be set to range values.

The first target rotational speed and the second target rotational speed may be factory default built-in parameters of the impact fastening tool, or may be set by a user through hardware or software. For example, the impact fastening tool may receive the first target rotational speed and the second target rotational speed selected by the user through a functional panel (not shown) provided on the housing 101 of the impact fastening tool. The first target rotational speed and the second target rotational speed may have different values based on different user requirements or technical parameters of impact fastening tools with different powers. The numerical values mentioned in this embodiment are only examples and are not limited in this embodiment.

Figure 5:
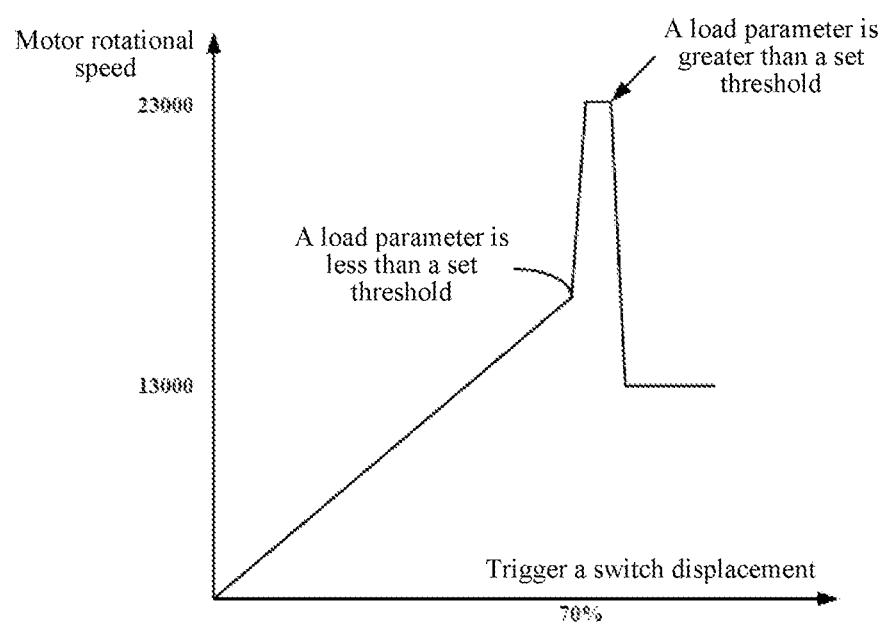
FIG. 5 is a curve of a relationship between a trigger switch run length and motor control according to an example embodiment of the present application.

Since a value of the first target rotational speed is relatively high, to stabilize the speed increase during a startup phase, the trigger switch may be arranged, for example, before a displacement reaches 70%, to increase the speed by linearly increasing the PWM duty cycle. After the trigger switch reaches 70%, a program for detecting the load parameter and determining the operational status is started. For example, after the trigger switch is pressed to 70%, the motor rotational speed reaches 23,000 RPM. When it is detected that the load parameter is greater than the set threshold, according to this embodiment, the motor is subject to steady speed control in the second operational status to maintain the motor rotational speed at 13,000 RPM, as shown in FIG. 5.

Figure 6:
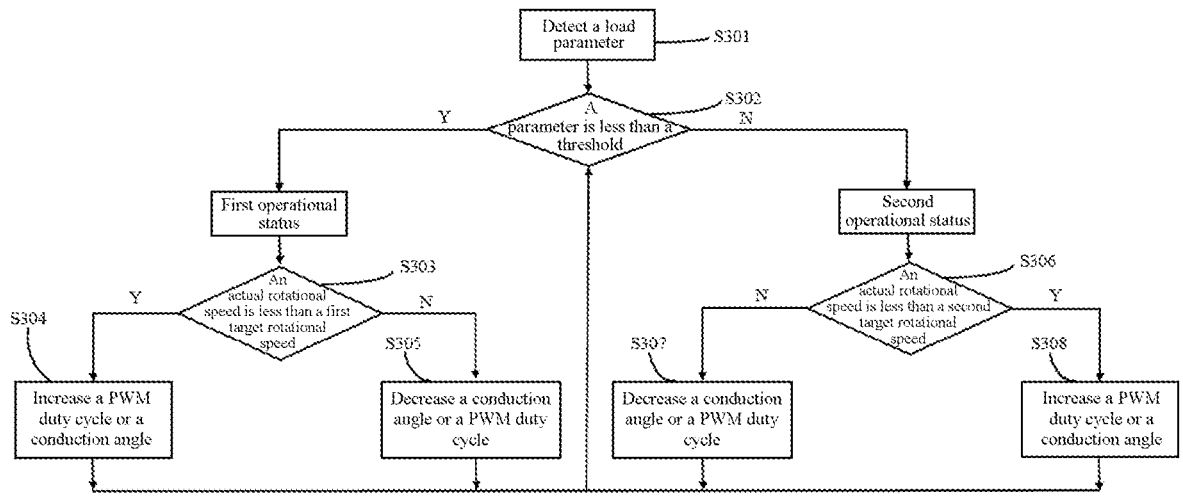
FIG. 6 is a schematic flowchart of a control method according to an example embodiment of the present application.

FIG. 6 is a schematic flowchart of a control method according to an example.

Step S301: Detect a parameter indicating a workload of a motor.

Step S302: Determine whether it is in a first operational status or a second operational status based on the parameter.

Step S303: When it is determined that the parameter is in the first operational status in which the parameter is less than a threshold, it is determined whether an actual motor rotational speed calculated by a controller is less than a first target rotational speed.

Step S304: When it is determined that the actual motor rotational speed is less than the first target rotational speed, the motor rotational speed is increased by increasing a PWM duty cycle or a conduction angle.

Step S305: When it is determined that the actual motor rotational speed is not less than the first target rotational speed, the motor rotational speed is decreased by decreasing the conduction angle or the PWM duty cycle.

Step S306: When it is determined that the parameter is in the second operational status in which the parameter is not less than the threshold, it is determined whether the actual motor rotational speed calculated by the controller is less than a second target rotational speed.

Step S307: When it is determined that the actual motor rotational speed is not less than the second target rotational speed, the motor rotational speed is decreased by decreasing the conduction angle or the PWM duty cycle.

Step S308: When it is determined that the actual motor rotational speed is less than the second target rotational speed, the motor rotational speed is increased by increasing the PWM duty cycle or the conduction angle.

A series of controls are executed repeatedly from S301 to S308, so that the PWM duty cycle and/or the conduction angle for driving the motor is controlled, and finally the motor rotational speed is maintained at the first target rotational speed or the second target rotational speed.

Figure 7A:
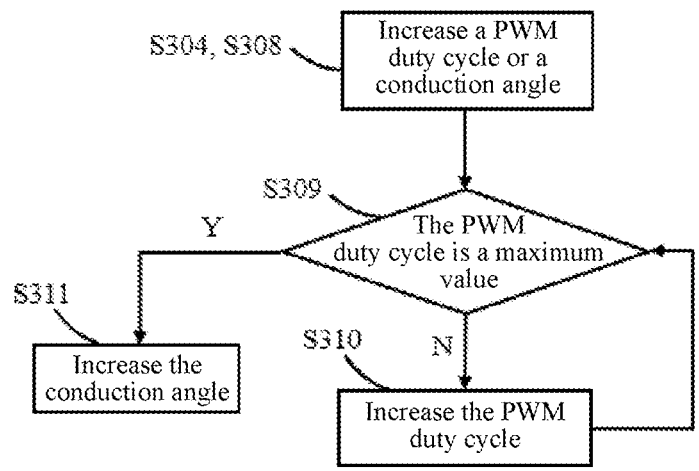
FIG. 7A is a schematic flowchart of increasing a PWM duty cycle or a conduction angle according to an example embodiment of the present application.

Specifically, FIG. 7A is a specific process of increasing the PWM duty cycle or the conduction angle in the foregoing S304 and S308 processes. When it is determined that the PWM duty cycle or the conduction angle needs to be increased, the steps are as follows:

Step S309: Determine whether a current PWM duty cycle is a maximum value.

Step S310: When it is determined that the PWM duty cycle is not the maximum value, the PWM duty cycle is increased.

Step S311: When it is determined that the PWM duty cycle is the maximum value, the conduction angle is increased.

The foregoing series of controls are executed repeatedly from S309 to S311, when the PWM duty cycle or the conduction angle needs to be increased, an adjustment of the PWM duty cycle is prioritized over an adjustment of the conduction angle.

Figure 7B:
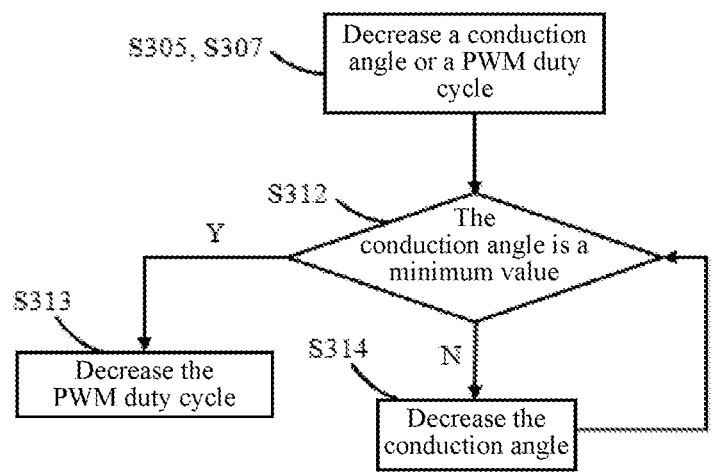
FIG. 7B is a schematic flowchart of decreasing a conduction angle or a PWM duty cycle according to an example embodiment of the present application.
Figure 8:
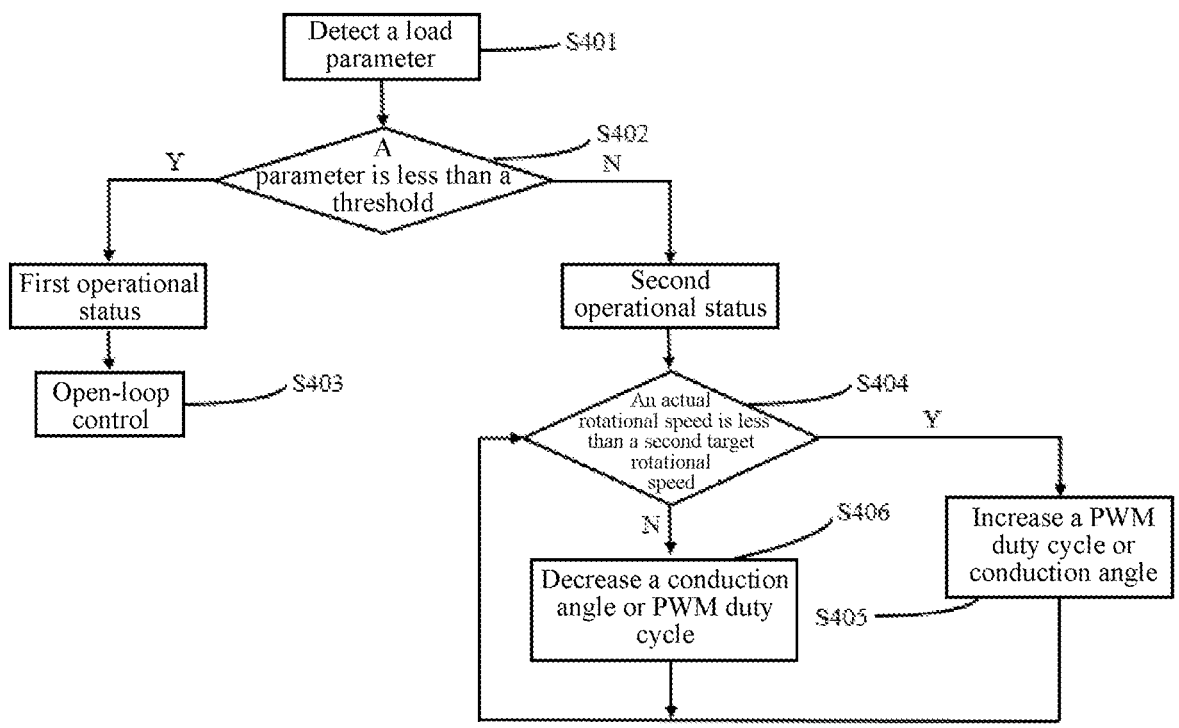
FIG. 8 is a schematic flowchart of a control method according to an example embodiment of the present application.

Specifically, FIG. 7B is a specific process of decreasing the conduction angle or the PWM duty cycle in the foregoing S305 and S307 processes. When it is determined that the conduction angle or the PWM duty cycle needs to be decreased, the steps are as follows:

Step S312: Determine whether a current conduction angle is a minimum value.

Step S313: When it is determined that the current conduction angle is the minimum value, the PWM duty cycle is decreased.

Step S314: When it is determined that the current conduction angle is not the minimum value, the conduction angle is decreased.

The foregoing series of controls are executed repeatedly from S312 to S314, when the conduction angle or the PWM duty cycle needs to be decreased, the adjustment of the conduction angle is prioritized over the adjustment of the PWM duty cycle.

In some embodiments, when the motor is in the first operational status, uses an open-loop control mode to control the motor.

Specifically, the open-loop control mode uses a mode of linearly adjusting the PWM duty cycle and/or the conduction angle based on the displacement of the trigger switch. For example, the displacement of the trigger switch changes from 0% to 100%, and the PWM duty cycle also changes linearly from 0% to 100%. During this process, the conduction angle always maintains the initial value. For another example, the trigger switch changes from 0% to 70%, the PWM duty cycle changes linearly from 0% to 100%, the trigger switch changes from 70% to 100%, and the conduction angle increases from the initial value to the specified value. The specified value may be a factory default built-in parameter, or may be set by the user based on rotational speed requirements.

In a first state, the open-loop control mode is used, and the motor is set based on a program. Generally, when the trigger switch is moved to 100%, a running speed of the motor at no load is a maximum rotational speed of the motor in the open-loop control mode.

The motor rotational speed of the impact fastening tool is controlled to maintain a second target rotational speed in the second operational status, so that the impact fastening tool is prevented from being damaged due to large fluctuations in the motor rotational speed under a heavy load. In the first operational status, the open-loop control mode is used to control the motor rotational, so that the user can control the motor rotational speed based on actual requirements of the impact fastening tool in the first operational status. The second target rotational speed is less than a maximum motor rotational speed in the open-loop control mode.

In the first operational status, selecting open-loop control cannot only optimize and control the program, but also reduce power loss in the first operational status.

FIG. 7 is a schematic flowchart of a control method for some embodiments.

Step S401: Detect a parameter indicating a load of a motor.

Step S402: Determine whether it is in a first operational status or a second operational status based on the parameter.

Step S403: When it is determined to be in the first operational status, open-loop control is used.

Step S404: When it is determined to be in the second operational status, it is determined based on the actual motor rotational speed whether it is less than the second target rotational speed.

Step S405: When it is determined that the actual motor rotational speed is less than the second target rotational speed, the motor rotational speed is increased by increasing a PWM duty cycle or a conduction angle.

Step S406: When it is determined that the actual motor rotational speed is not less than the second target rotational speed, the motor rotational speed is decreased by decreasing the conduction angle or the PWM duty cycle.

A series of controls are executed repeatedly from S401 to S406, so that the PWM duty cycle and/or the conduction angle for driving the motor is controlled, and finally the motor rotational speed is maintained at the second target rotational speed or the motor is controlled in an open-loop.

In this embodiment, modes of increasing the PWM duty cycle or the conduction angle and decreasing the conduction angle or the PWM duty cycle are consistent with the processes shown in FIG. 7A and FIG. 7B. Details are not described herein.

In addition, it should be further noted that, the combination of technical features in the disclosure is not limited to the combination described in the claims of the disclosure or the combination described in the specific embodiments. All technical features described in the disclosure may be freely combined or combined in any way, unless there is a conflict between each other.

It should be noted that the foregoing examples are merely specific embodiments of the present application. Obviously, the present application is not limited to the foregoing embodiments, and there are many similar changes. All modifications directly derived or thought of by a person skilled in the art from the disclosure of the present application shall fall within the protection scope of the present application.

It should be understood that the first, second, and other qualifiers mentioned in the embodiments of the present application are merely used to describe the technical solutions of the embodiments of the present application more clearly and cannot be used to limit the protection scope of the present application.

The foregoing descriptions are merely preferred embodiments of the present application, are not intended to limit the protection scope of the present application. A person skilled in the art may make various modifications and changes to this disclosure. Any modification, equivalent replacement, or improvement made without departing from the spirit and principle of this disclosure shall fall within the protection scope of this disclosure.

What is claimed is:

1. A power tool comprising:
a brushless motor comprising a stator and a rotor;
an inverter circuit comprising a plurality of switch components, wherein the plurality of switch components are configured to perform a switch action to control driving of the brushless motor; and
a controller electrically connected to the inverter circuit and the brushless motor, the controller comprising a load detection module configured to detect a parameter indicating a workload of the brushless motor,
wherein:
in response to the parameter being less than a set threshold, the controller is configured to control the brushless motor to maintain a first target rotational speed,
in response to the parameter being greater than or equal to the set threshold, the controller is configured to control the brushless motor to maintain a second target rotational speed,
the first target rotational speed is greater than the second target rotational speed, and
the controller is configured to:
adjust a pulse-width modulation (PWM) duty cycle and/or a conduction angle of a switch component of the plurality of switch components, so that the brushless motor maintains the first target rotational speed or the second target rotational speed, and
increase the PWM duty cycle and/or the conduction angle of the switch component in response to the parameter being less than the set threshold and an actual motor rotational speed being less than the first target rotational speed or in response to the parameter being greater than or equal to the set threshold and the actual motor rotational speed being less than the second target rotational speed, wherein an adjustment priority of the PWM duty cycle is higher than an adjustment priority of the conduction angle, or decrease the PWM duty cycle and/or the conduction angle of the switch component in response to the parameter being less than the set threshold and an actual motor rotational speed being greater than the first target rotational speed or in response to the parameter being greater than or equal to the set threshold and the actual motor rotational speed being greater than the second target rotational speed, wherein an adjustment priority of the conduction angle is higher than an adjustment priority of the PWM duty cycle.

2. The power tool according to claim 1, wherein the controller is further configured to adjust an advance angle of a switch component of the plurality of switch components.

3. The power tool according to claim 1, wherein the brushless motor is a three-phase brushless motor, the brushless motor comprises a position sensor, the controller is configured to calculate an actual motor rotational speed based on a signal transmitted by the position sensor, and a conduction angle of each phase in the three-phase brushless motor has a minimum value of 120° and a maximum value of 180°.

4. The power tool according to claim 1, wherein the controller is configured to adjust the conduction angle by a fixed increment slope, and a fixed increment associated with the fixed increment slope is a value from 0.1° to 0.5°.

5. The power tool according to claim 1, wherein the power tool is an impact fastening tool, wherein the impact fastening tool comprises an impact mechanism, and in response to the parameter being greater than or equal to the set threshold, the impact mechanism is configured to perform an impact action.

6. The power tool according to claim 1, wherein:
the power tool is an impact fastening tool, and the impact fastening tool further comprises an impact mechanism;
the set threshold is corresponding to whether the impact mechanism performs an impact fastening action; and
in a situation that the parameter being less than a set threshold, the impact mechanism does not perform an impact fastening action, and in a situation that the parameter being greater than or equal to the set threshold, the impact mechanism performs an impact fastening action.

7. The power tool according to claim 1, wherein in response to the parameter being less than a set threshold, the controller is configured to control the brushless motor to maintain the first target rotational speed in a closed-loop mode.

8. A method for controlling a power tool, comprising:
detecting, by a controller, a parameter indicating a workload of a brushless motor, and determining an operational status of the power tool based on the parameter; and
controlling, by the controller, in response to determining that the parameter is less than a set threshold, the brushless motor to maintain a first target rotational speed; or
controlling, by the controller, in response to determining that the parameter is greater than or equal to the set threshold, the brushless motor to maintain a second target rotational speed, wherein:
the first target rotational speed is greater than the second target rotational speed; and
the controlling, by the controller, the brushless motor to maintain the first target rotational speed, or the controlling, by the controller, the brushless motor to maintain the second target rotational speed comprises:
calculating, by the controller, an actual motor rotational speed of the brushless motor, and
increasing, by the controller, in response to determining that the actual motor rotational speed is less than the first target rotational speed or the actual motor rotational speed is less than the second target rotational speed, a pulse-width modulation (PWM) duty cycle and/or a conduction angle for driving the brushless motor, wherein an adjustment priority of the PWM duty cycle is higher than an adjustment priority of the conduction angle; or
the controlling, by the controller, the brushless motor to maintain the first target rotational speed, or the controlling, by the controller, the brushless motor to maintain the second target rotational speed comprises:
calculating, by the controller, an actual motor rotational speed of the brushless motor, and
increasing, by the controller, in response to determining that the actual motor rotational speed is less than the first target rotational speed or the actual motor rotational speed is less than the second target rotational speed, a pulse-width modulation (PWM) duty cycle and/or a conduction angle for driving the brushless motor, wherein an adjustment priority of the PWM duty cycle is higher than an adjustment priority of the conduction angle.

9. The method according to claim 8, further comprising adjusting, by the controller, an advance angle for driving the brushless motor.

10. The method according to claim 8, wherein:
the power tool is an impact fastening tool, and the impact fastening tool further comprises an impact mechanism;
wherein the set threshold is corresponding to whether the impact mechanism performs an impact fastening action; and
in a situation that the parameter being less than a set threshold, the impact mechanism does not perform an impact fastening action, and in a situation that the parameter being greater than or equal to the set threshold, the impact mechanism performs an impact fastening action.

11. The method according to claim 8, wherein in response to the parameter being less than a set threshold, the controller is configured to control the brushless motor to maintain the first target rotational speed in a closed-loop mode.

12. A power tool comprising:
a brushless motor comprising a stator and a rotor;
an inverter circuit comprising a plurality of switch components, wherein the plurality of switch components are configured to perform a switch action to control driving of the brushless motor; and
a controller electrically connected to the inverter circuit and the brushless motor, the controller comprising a load detection module configured to detect a parameter indicating a workload of the brushless motor,
wherein:
in response to the parameter being greater than or equal to a set threshold, the controller is configured to control the brushless motor to maintain a target rotational speed, in response to the parameter being less than the set threshold, the controller is configured to control the brushless motor in an open-loop mode, and the brushless motor has a maximum rotational speed under a control in the open-loop mode, the maximum rotational speed under the control in the open-loop mode is greater than the target rotational speed, and the controller is configured to:

adjust a pulse-width modulation (PWM) duty cycle and/or a conduction angle of a switch component of the plurality of switch components, so that the brushless motor maintains the target rotational speed, and increase the PWM duty cycle and/or the conduction angle of the switch component in response to the parameter being greater than or equal to the set threshold and an actual motor rotational speed being less than the target rotational speed, and wherein an adjustment priority of the PWM duty cycle is higher than an adjustment priority of the conduction angle; or decrease the conduction angle and/or the PWM duty cycle of the switch component in response to the parameter being greater than or equal to the set threshold and an actual motor rotational speed is greater than the target rotational speed, and wherein an adjustment priority of the conduction angle is higher than an adjustment priority of the PWM duty cycle.

13. The power tool according to claim 12, wherein:

the power tool is an impact fastening tool, and the impact fastening tool further comprises an impact mechanism;

wherein the set threshold is corresponding to whether the impact mechanism performs an impact fastening action; and in a situation that the parameter being less than a set threshold, the impact mechanism does not perform an impact fastening action, and in a situation that the parameter being greater than or equal to the set threshold, the impact mechanism performs an impact fastening action.

* * * * *